United States Patent
Spitzer, Sr.

[11] Patent Number: 5,988,202
[45] Date of Patent: Nov. 23, 1999

[54] PRE-SET MAXIMUM FLOW METERING AND MIXING VALVES

[76] Inventor: Harry L. Spitzer, Sr., 16318 Rappelo Rd., Brooksville, Fla. 34601

[21] Appl. No.: 09/184,915
[22] Filed: Nov. 2, 1998
[51] Int. Cl.⁶ .................................................. F16K 11/02
[52] U.S. Cl. ......................... 137/269; 137/625.4; 251/122
[58] Field of Search ................................... 137/269, 605, 137/607, 625.4; 251/122, 223

[56] References Cited

U.S. PATENT DOCUMENTS

| | | | |
|---|---|---|---|
| 274,512 | 3/1883 | O'Reilly | 251/223 |
| 1,763,313 | 6/1930 | McClatchie | 251/223 X |
| 2,516,825 | 7/1950 | Hejduk et al. | 251/122 |
| 3,228,655 | 1/1966 | Weise | 251/122 X |
| 3,240,230 | 3/1966 | Callahan | 251/223 |
| 4,134,420 | 1/1979 | Okonowitz | 251/223 X |
| 5,544,674 | 8/1996 | Kelly | 251/122 X |

*Primary Examiner*—Stephen M. Hepperle
*Attorney, Agent, or Firm*—Charles A. McClure

[57] ABSTRACT

Pre-set maximum-flow metering and mixing valves and methods of their operation, including limiting maximum axial (longitudinal) withdrawal of a valve metering stem corresponding to its minimally outlet-occluding location at fully open valve position. A sleeved member is threaded within a mating threaded end of a valve housing and about a mating end of an axially (longitudinally) adjustable flow-metering stem member to limit its travel (as by rotation) from seated fully closed position to a fully open position, corresponding to maximum withdrawal of its tapered end portion from its occluding insertion within the fluid outlet.

6 Claims, 4 Drawing Sheets

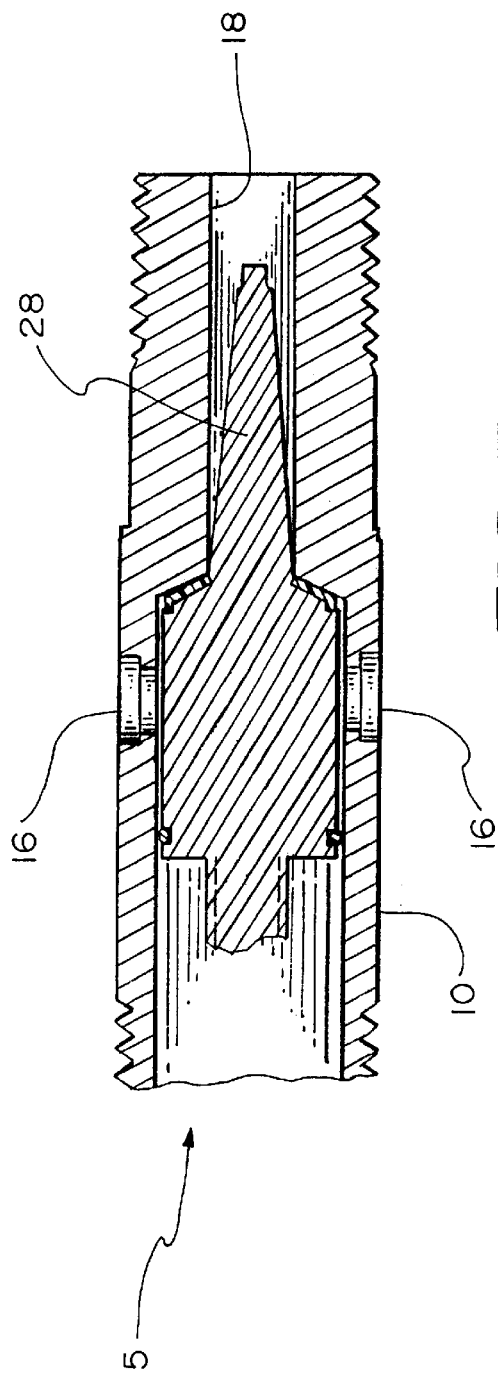
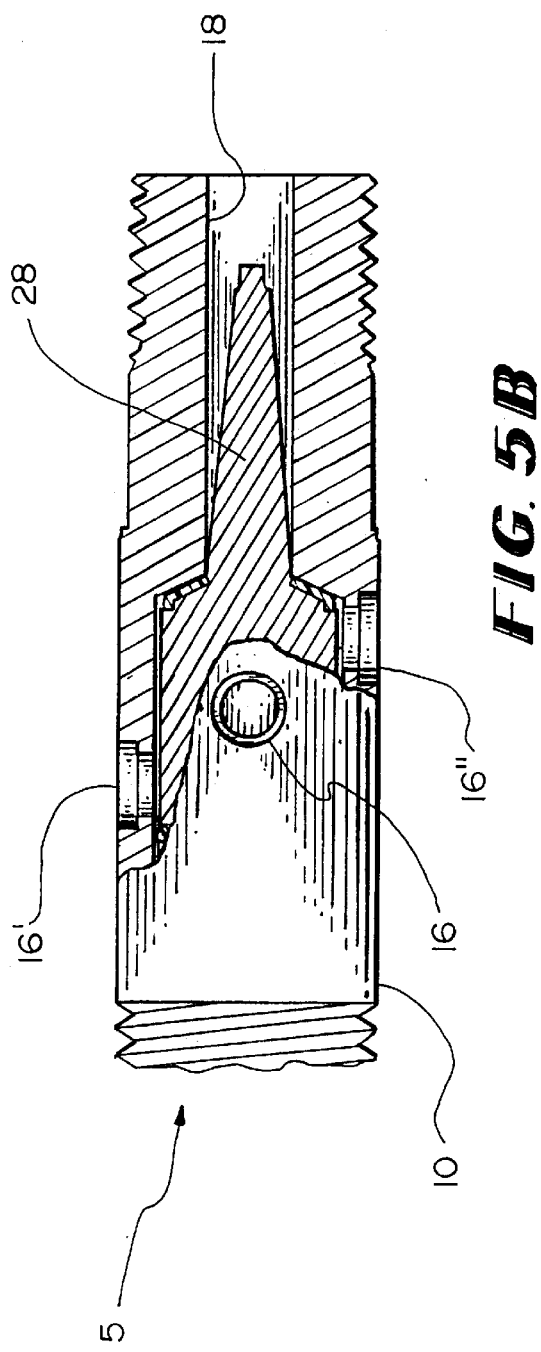

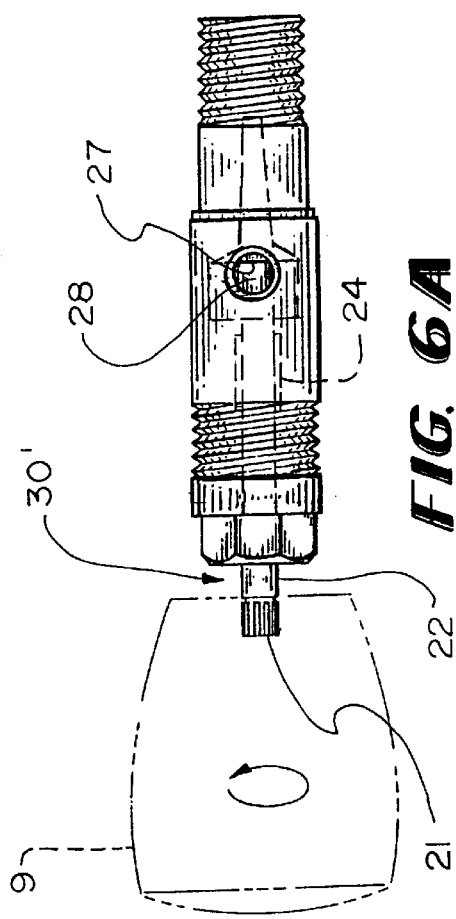
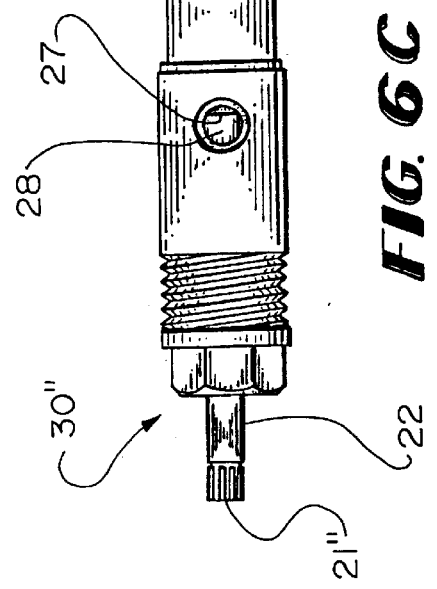
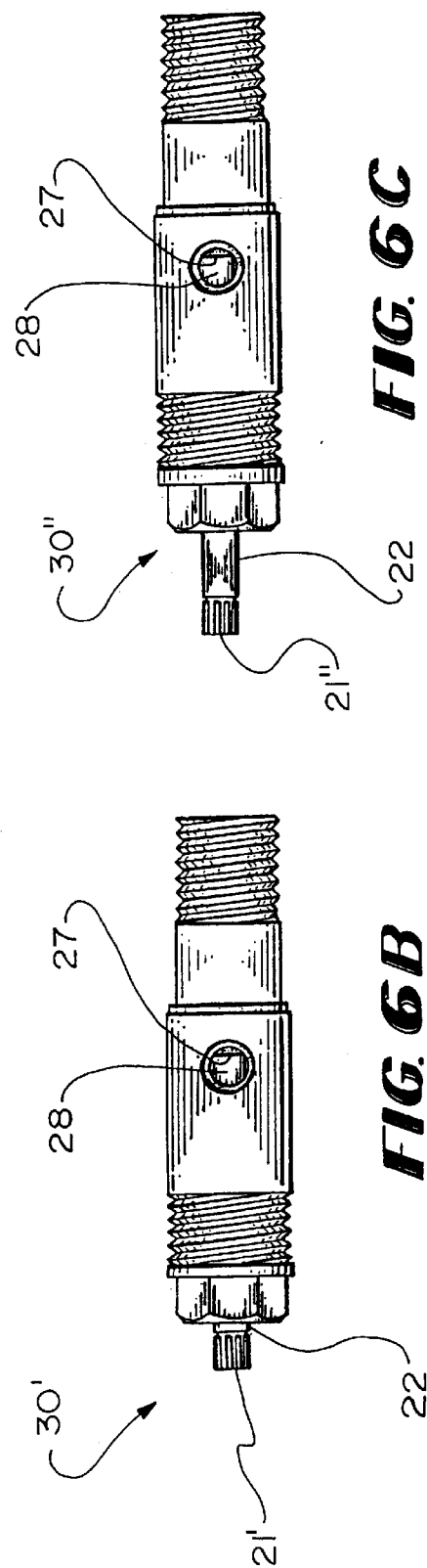

PRE-SET MAXIMUM FLOW METERING AND MIXING VALVES

TECHNICAL FIELD

This invention relates to flow-metering valves and flow-mixing valves, and especially to pre-setting of maximum flows therethrough.

BACKGROUND OF THE INVENTION

Metering and mixing valves are essential in many uses, in home showers, in industrial processes, and in scientific experimentation. Each variable-flow valve has a maximum flow rate at whatever head pressure it is expected to operate, but desired ranges of flow rates may occupy only a lower part of the valve flow capability and hence may be conducive to careless or even intentional wastage of fluid.

Various metering and mixing valves appear in U.S. Pat. Nos., such as Moen 3,592,229; Redman 4,263,940; Hammett et al. 5,322,645; and Anwaerter et al. 5,697,554. In view of inherent limits on maximum flow in substantially all valve designs, those inventors' principal objectives did not include intentional or readily adjustable maximum flow limitation, and their respective contributions differed also.

Despite the foregoing and other examples of meritorious valves, a need remains for built-in control of maximum flow rate, readily pre-settable but precluding resetting by uninformed users.

SUMMARY OF THE INVENTION

A primary object of the present invention is to preclude, or at least limit, wastage of valuable fluids, which may be water, or may be gases, other liquids, or slurries—as by careless use practices.

Another object of this invention is to provide designs of fluid valves having built-in capability of maximum-flow limitation.

A further object of the invention is to enable similar control in mixing valves, including limiting the ratio of composition or of temperature, for example, in a composite output from plural inputs.

In general, the objects of the present invention are attained, in a valve having a housing, a metering stem controlling outlet flow from closed (shut-off) position to progressively increasing flow, dependent upon extent of stem withdrawal from the fluid outlet, and limiting maximum withdrawal of such metering stem to a fully open valve position relative to a tranverse fluid inlet into the housing.

More particularly, a sleeved member externally threaded within an internally threaded end of the valve housing, and also internally threaded onto an axial in-line externally threaded adjustment stem, limits axial (longitudinal) unscrewing opening travel of both stems.

SUMMARY OF THE DRAWINGS

FIG. 5A is a side sectional elevational detail of another embodiment, with the housing modified to include a plurality of fluid inlet bores at a like axial distance from the seat therein;

FIG. 5B is a medial side sectional detail of a further embodiment with the housing modified to include a plurality of fluid inlet bores at respective unlike axial distances from the seat therein; and FIGS. 6A, 6B, and 6C are side sectional details of a series of sleeved members effective to limit maximum open travel of the stems.

DESCRIPTION OF THE INVENTION

The following description, and accompanying diagrams, of various embodiments are presented by way of example rather than limitation.

Figure 1:
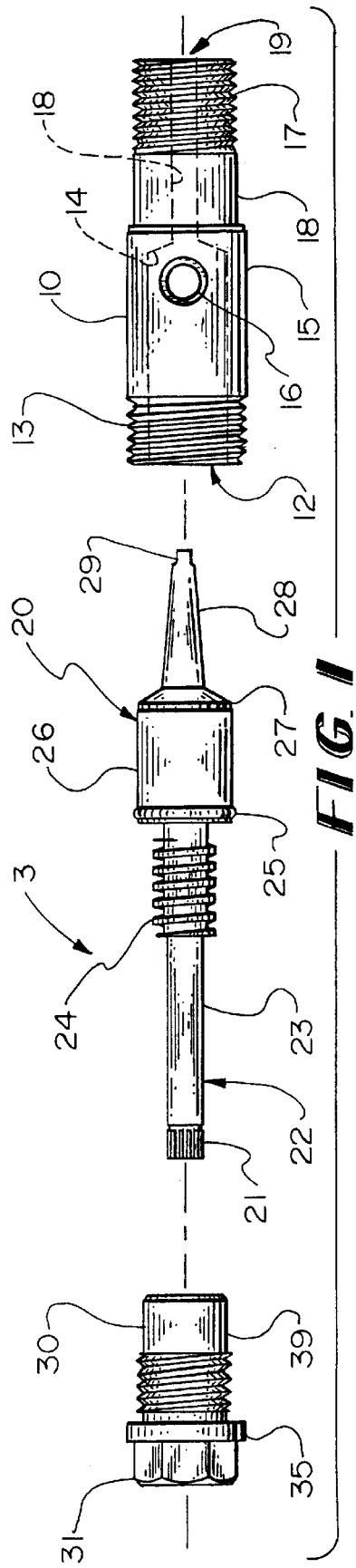
FIG. 1 is an exploded side elevation of the invention embodied in a cylindrical housing, movable inner member, and collared sleeve.

FIG. 1 shows, in axial (longitudinal) exploded side elevation, first embodiment 3 of this invention, which features (right to left) unitary cylindrical housing 10, unitary inner piston-like member 20, and unitary collared sleeve member 30—all mutually coaxial.

Housing 10 includes externally threaded left end portion 13, and externally threaded right (outlet) end portion 17, flanking smooth intermediate portion 15, having transverse fluid inlet bore 16 (note arrow) just to the right of midway. The housing is cylindrically bored throughout, beginning with large bore 12 at its left end, and transitioning via transverse valve seat portion 14, where it tapers to reduced cylindrical bore 18, which continues to end at outlet 19.

Piston-like inner member 20 has adjustment stem portion 22 at the left, with its left end 21 ridged to enable non-slipping contact with a faucet (shown later) or other rotative means, then with smooth adjacent portion 23, followed by helically threaded portion 24 to its junction with larger cylindrical body portion 26. O-ring 25 is carried in grooving of that body portion near its left edge, whereas its right edge carries ringlike seal 27, preferably tapering (shown) frusto-conically to the adjoining generally cylindrical metering stem 28, which itself tapers to a minimum diameter at its right end 29.

Coaxial collared sleeve member 30 includes preferably hexagonal (or square) head 31, and collar 35, from which (right) end portion 39 extends, being externally threaded part of the way so as to mate with the internally threaded large bore of housing end 12. The latter end of the sleeve member is also internally threaded (as shown later) to mate with externally threaded portion 24 of adjustment stem 22.

Figure 2:
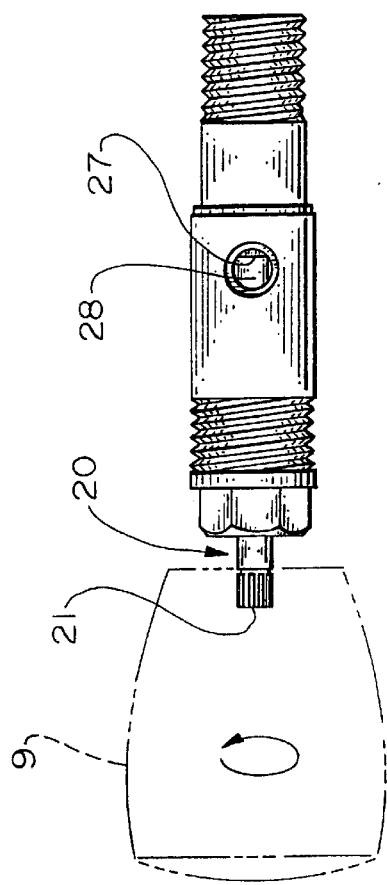
FIG. 2 is a fully assembled medial side sectional elevation of the cylindrical component members of FIG. 1, plus a faucet handle.

FIG. 2 shows, in medial side sectional elevation, the component cylindrical members of FIG. 1, fully assembled, plus faucet handle 9 fitted onto ridged end portion 21 of inner member 20 so as to enable manual rotative on/off adjustment, if desired (often conventional). The inner member is shown in closed (shut-off) outlet position, with its ringlike seal 27 engaged against mating seat 14 of the housing, at furthest protrusion of metering stem 28 into outlet bore 18 of the housing, whereupon the upstream end of intermediate body portion 26, with O-ring 25, at least partially occludes fluid inlet bore 16.

Figure 3:
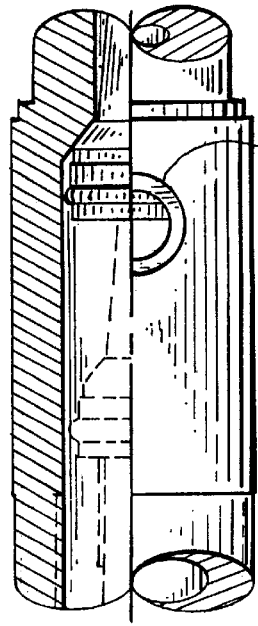
FIG. 3 is an expanded side sectional detail of FIG. 2, showing the component movable seal and fixed housing seat in closed position with an alternative open position thereof shown in broken lines.

FIG. 3 shows, in enlarged detail, the fluid passage portions of this valve embodiment, with the fully closed position in solid lines and the fully open position in broken lines.

It will be understood that the fluid inlet bore 16 may be relocated (as 16') completely clear when the downstream outlet is fully closed or even completely blocked (as 16") in that fully closed position, if desired.

Valve operation according to the first embodiment of the present invention is readily understood from the drawings and description, and is summarized below (reference numerals omitted as superfluous). Assembly of the valve may be accomplished in a couple of ways, thus:

(i) by threading the collared sleeve member onto the helically threaded end portion of the stem-bearing inner member as far as possible, then inserting and threading that partial assembly into the large bore of the housing until its collar abuts the housing end; or (ii) inserting the tapered metering stem of the inner member into the large bore open end of the housing as far as possible, then inserting the threaded end of the collared sleeve over the protruding end of the adjustment stem and threading it onto externally threaded end portion 24 of the inner member as far as possible.

The fully assembled valve is initially in the closed position. It can be opened progressively by counterclockwise rotation of the adjustment stem, as by means of a faucet on its ridged end. The axial movement of the hidden metering stem from the seat is readily observable, as the tapered seal comes into view from the downstream direction, so long as no fluid line is connected to the fluid inlet. The metering stem taper controls the rate of increase in flow rate as it is withdrawn from the fluid outlet, whereas maximum withdrawal (hence, maximum flow) is controlled by the collared sleeve member. This feature is versatile and gives rise to additional embodiments.

Figure 4A:
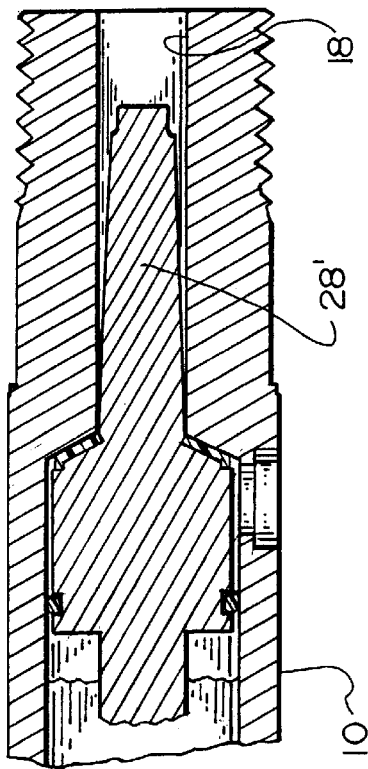
FIGS. 4A, 4B, and 4C are side sectional details of a series of metering stem portions differing in length and/or in taper, shown in closed position, and in alternative open positions (broken lines)
Figure 4B:
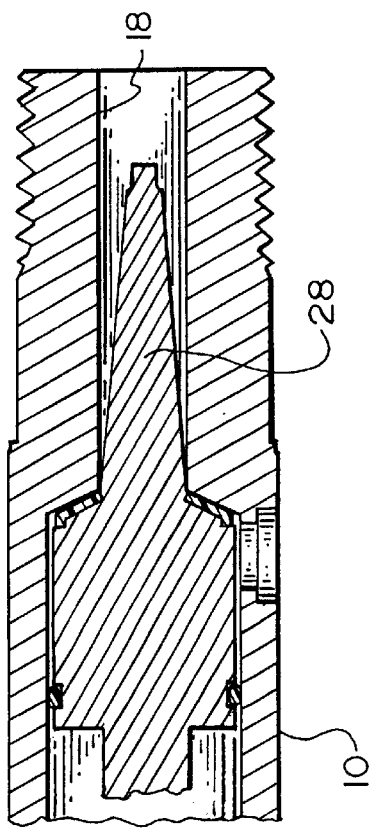
Figure 4C:
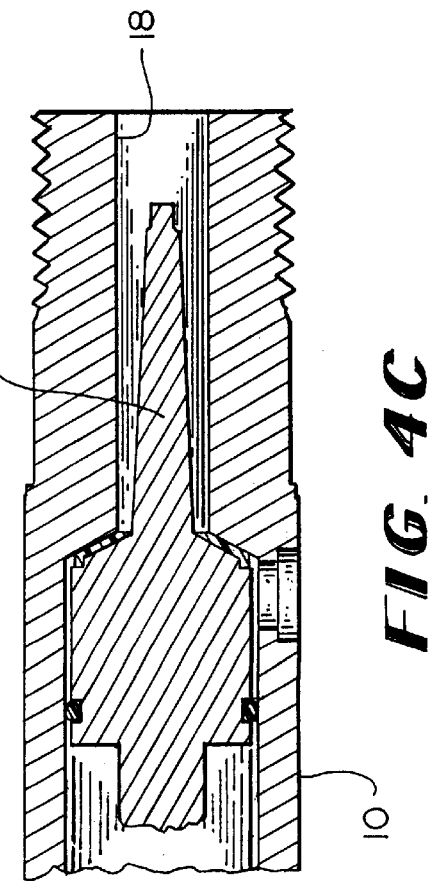

FIGS. 4A, 4B, and 4C show, in side sectional detail, a series of interchangeable metering stem embodiments differing in length and/or in taper, shown in closed position and in alternative open positions (broken lines), all for same housing 10. Thus, FIG. 4A shows medium taper metering stem 28 of preceding views, whereas FIG. 4B shows metering stem 28' with less taper, conducive to less rate of change and lower maximum flow rate; and FIG. 4C shows metering stem 28" with more taper, conducive to a greater rate of change and higher maximum rate. Such metering stems are usable interchangeably in housing 10.

FIG. 5A shows, in medial side sectional detail, embodiment 5 of this invention, with the valve housing modified to include a plurality of fluid inlet bores 16, 16 directly across from each other and, thus, at a like axial distance from the outlet seat, as well as at a like degree of occlusion by metering stem 28. Such modification enables mixing of two fluids, which may differ from one another as little as hot water and cold water at equal head pressure, whereupon equal mixing is feasible. Thus, water at temperature $t_x°$, and water at unlike temperature $t_y°$, via inlet bores 16, 16 would yield water of average temperature $(t_x°+t_y°)/2$ at outlet bore 19.

Moreover, varied inlet bore sizes (perhaps also slanted), as for use with the same or different fluids, could provide desired degrees of mixing at a given time, or as might be desired over time. Because unlike fluids may be mutually reactive, multiple fluid inlets enable the large bore to be utilized as an input fluid reaction chamber.

FIG. 5B shows, in like sectional detail, further embodiment 6 of the present invention, with the valve housing modified to include plurality of fluid inlet bores 16, 16' and 16" at unlike axial distances from the seat therein, as suggested in FIG. 3. Here inlet bore 16' nearest the outlet end is clear, intermediate inlet bore 16 is partially occluded, and inlet bore 16" furthest from the outlet is completely occluded. If such setting allows quantity y of component Y and quantity x of component X to enter, where y=2x the resulting mixture should contain twice as much Y as X (e.g., in compound YXY).

FIGS. 6A, 6B, and 6C show a set of successive sleeved members: (i) 30 with end 39, as in FIGS. 1 and 2; (ii) alternative embodiment 30' with shorter end 39', enabling further unscrewing withdrawal of externally threaded part 24 of adjusting stem 22 therewithin; and (iii) alternative 30", whose end 39" has a longer unthreaded portion, thus limiting travel of adjusting stem 22 even more than end 39 does.

This invention does not require exotic materials or machinery. The three parts may be made of suitable metallic material, such as aluminum, brass, bronze, or steel. Alternatively, polymeric material such as nylon, polycarbonate, or polypropylene may be satisfactory in many uses. More exotic uses may demand special carbons or siloxanes.

Simplicity of production and assembly, and other advantages or benefits of these three-piece valves will become most apparent to and be best appreciated by persons who undertake to make and/or use them.

Preferred embodiments and variants have been suggested herein. Other modifications may be made, as by adding, combining, deleting, or subdividing compositions, parts, or steps, while retaining some of the advantages and benefits of the present invention—which itself is defined in the following claims.

What is claimed is:

1. A set of interchangeable fluid valves, pre-settable for different maximum flow, each such fluid valve comprising:

a housing with cylindrical inner wall defining a large smooth axial bore from a short internally threaded portion at one open end to a transverse junction with a small smooth coaxial bore on to a fluid outlet in another open end, the junction from large bore to small bore forming a transverse ringlike seat, and a fluid inlet through the housing wall into the large bore near the junction;

an axially extending inner valve member having an intermediate portion slidably sealed against the large bore housing wall and having flanking oppositely extending stem portions: (i) a metering stem from a transverse ring-like seat junction adapted to engage the seat of the housing at closed (no flow) position only, disengageable therefrom to open positions, intruding into the small outlet bore, (ii) an adjustment stem externally threaded within the large bore and protruding therefrom for contact with flow-adjusting means; and a collared sleeve member threaded internally to mate with the external threading of the adjustment stem and threaded externally to mate rotatable with an internally threaded portion of the housing large bore at and near its open end until seating its collar against that end, thereby determining least occlusion of the outlet bore by the metering stem in the fully open (maximum flow) position;

differing in at least two of the following features:
        (a) taper of the meteringstem,
        (b) inlet relation to seat seal at fully open position,
        (c) the uncollared length of the sleeve member.

2. Mixing valve with pre-settable maximum flow, comprising:

a cylindrical housing open at each end, having a plurality of transverse inlet bores from the exterior intersecting a large bore, which transitions into a small coaxial bore to a fluid outlet in its downstream end, and at its opposite end is internally threaded to receive external threading of a collared sleeve member fitting into that end until the collar of the sleeve member abuts the housing end;

a coaxial inner member having a downstream metering stem portion tapered to occlude the fluid outlet variably by intrusion thereinto, transitioning to a large intermediate portion movable along the large axial bore in sealing relation therewith, and having at its larger open end a protruding adjustment stem externally threaded partway to receive internal threading of the collared sleeve member;

wherein at least one of the plurality of intermediate inlet bores is nearest the outlet end of the outlet bore, and at least another one of such inlet bores is furthest from the outlet end of the outlet bore, and wherein the maximum unseated displacement of the intermediate member is adapted to occlude the latter inlet bore at least partially at maximum fluid flow through the valve.

3. Mixing valve according to claim 2, wherein one of the inlet bores admits a first fluid X and another of the inlet bores admits a second fluid, whereby the intermediate member is adapted by preset location thereof along the axis to control the ratio of the first fluid to the second fluid in the mixture at the outlet bore by partially occluding entry of fluid via the first inlet bore.

4. Mixing valve according to claim 3, in combination with a source of fluid X connected to the first inlet bore, and a source of fluid Y at the second inlet bore, and wherein the fluid mixture is limited to a maximum X/Y ratio by extent of partial occlusion of the second inlet bore at the maximum upstream position of the intermediate member upon preset maximum withdrawal rotation thereof.

5. Mixing valve output fluid combination according to claim 4, wherein the respective fluids are liquid water X at low temperature x and liquid water Y at higher temperature y, and the resultant mixture at the outlet bore is limited to liquid water at temperature $(x+y)/2$.

6. Method of controlling fluid flow, comprising these steps:

providing a plurality of transverse flow inlets into a large cylindrical axial bore having a transition to a relatively small coaxial outlet bore;

providing an inner member having an enlarged intermediate length portion in laterally sealing relation with and movable along the large axial bore, having (a) at its one end a metering stem adapted to occlude the outlet bore progressively, and (b) at its opposite end an adjustment stem protruding through the large bore adapted to limit the minimum occlusion of the outlet bore;

metering flow through the outlet bore by rotatively adjusting the axial position of the inner member and thereby altering the degree of occlusion of the outlet bore by the metering stem; and pre-setting the maximum flow through the outlet bore by limiting the minimum occlusion of the outlet bore by the metering stem;

including the additional step of locating at least two of the transverse flow inlets at different distances axially from the outlet of the outlet bore.

* * * * *